Feb. 19, 1963  F. P. DOWNING  3,078,287
FAT RENDERING
Filed Jan. 29, 1960
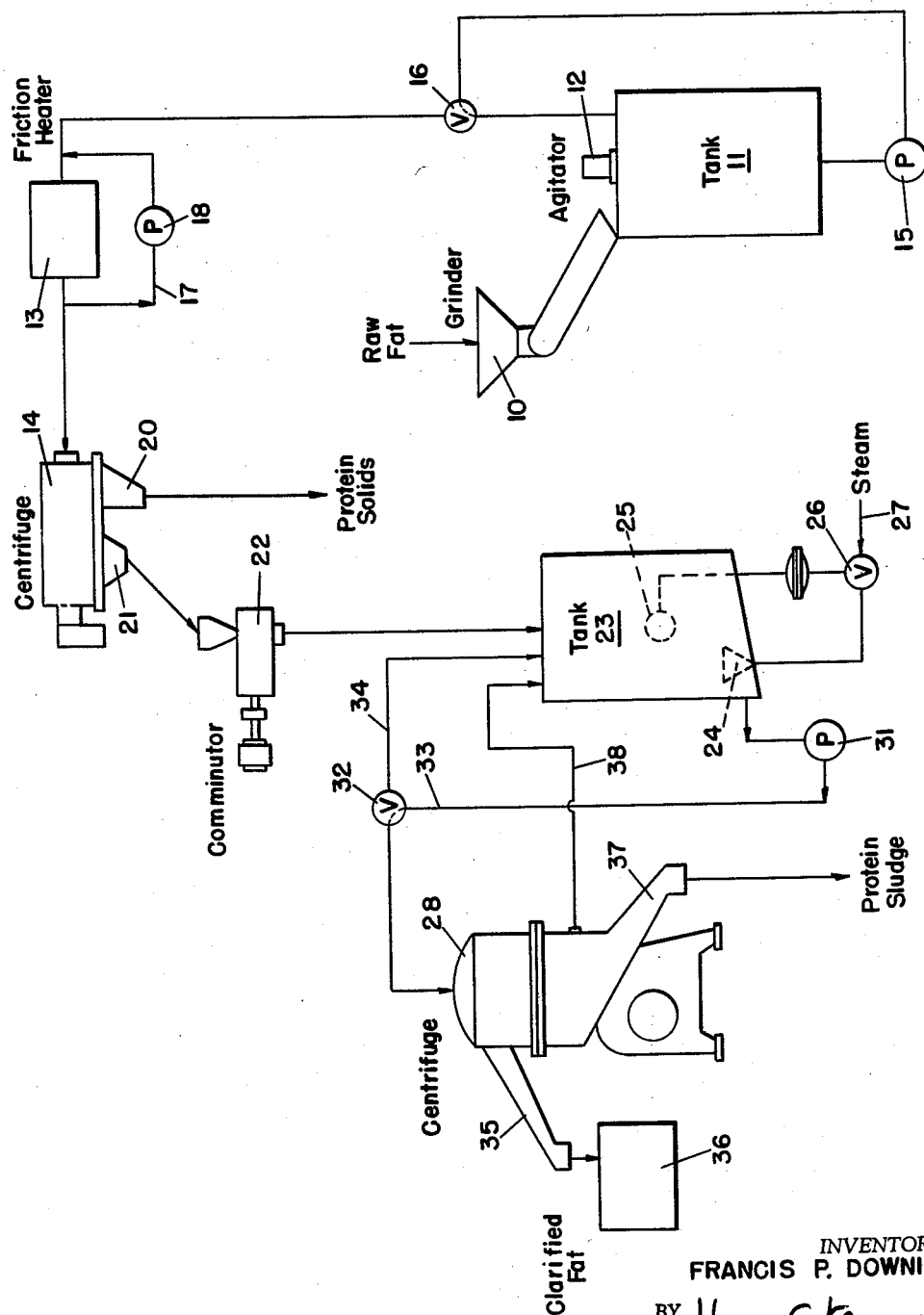
INVENTOR.
FRANCIS P. DOWNING
BY Hugo A. Kemman
ATTORNEY United States Patent Office 3,078,287
Patented Feb. 19, 1963

3,078,287
FAT RENDERING
Francis P. Downing, Philadelphia, Pa., assignor to The Sharples Corporation, a corporation of Delaware
Filed Jan. 29, 1960, Ser. No. 5,393
4 Claims. (Cl. 260—412.6)

This invention pertains to the mechanical defatting of fatty tissue derived from animals, such as hoge or cattle, to produce an uncooked meat product, i.e., a meat product in which the protein is not coagulated.

As is well known, the production and marketing of meat products are subject to stringent government regulation and supervision, and products intended for consumption by mankind must meet rather rigid specifications to obtain approval. Such specifications not only involve the source of the meat products, but equally important, sanitation during production, and the nutritional value of the particular meat product produced.

One important outlet for such fatty tissue in partially defatted and in uncooked state is in the production of sausage in which protein solids so derived may be substituted for sausage material derived from other sources, provided that such protein solids have the same or a higher nutritional value than the sausage material in prior use.

The determination of the nutritional value of a food is highly complicated, but in the case of protein solids it is based upon an analysis of the protein for the presence, in required quantity, of the ten essential amino acids which are regarded as necessary for body growth. These are lysine, trypotophen, histidiene, phenylalanine, leucine, isoleucine, threonine, methionine, valine and arginine. These essential amino acids are normally present in the protein solids of the fatty tissue which, however, in its normal state, contains far too much fat to be approved as a meat product for human consumption, such as in sausage.

The fat of the fatty tissue is, of course, a valuable product, and great strides have been made in the art in the recovery of the fat, in high quality and high yield, involving the mechanical rupturing of the fatty tissue at relatively low temperatures compared to those employed in the prior conventional wet or dry rendering methods. Although the protein solids thus recovered, particularly when employing the method of U.S. Patent 2,823,215, are of greatly improved value over those obtained when using either the wet or dry rendering method, the invention described and claimed in co-pending application Serial No. 757,598, now Patent 3,020,160, issued February 6, 1962, is an outstanding improvement from the standpoint of the production of an uncooked meat product meeting government specifications for sale as such, or in other form, such as in sausage. The present invention is an improvement over the methods of said prior patent and said co-pending application.

Sausage conventionally contains up to 45% moisture and up to 45% fat. Both moisture and fat contribute to texture. It is difficult, if not impossible from a practicable point of view, to add either component in large percentage to protein to synthesize a sausage mix. Moreover, fat sold as an ingredient in sausage commands a price, under present market conditions which is about twice that of separated fat per se. It follows that the direct production of uncooked sausage material with protein, fat and moisture properly proportioned is highly desirable economically.

In accordance with the present invention, the fatty tissue, whether chilled, warm or at room temperature, is ground or otherwise comminuted, e.g. to an average particle size between say $\frac{1}{32}''$ and $\frac{3}{4}''$. The ground mass is thereafter warmed by the direct or indirect application of heat to a temperature insufficiently high to melt higher melting fats present, e.g. to a temperature between 90° and 110° F., such as between 95° and 100° F. Thereafter, and by the direct application of mechanical energy to the ground mass, the ground mass is brought up to a temperature sufficiently high to melt all of the fat present, but not exceeding 120° F., and preferably not exceeding 117° F., whereby thermal equilibrium at a desired temperature for the separation of protein solids from fat is immediately reached throughout the ground mass. Melting of the fat is thus carried out without subjecting the protein solids to cooking or partial cooking conditions, i.e. the protein solids remain in wholly uncoagulated condition. As a result, the protein solids for practicable purposes, are recovered essentially in their original natural state. Since thermal equilibrium is reached immediately, the mass may be subjected to centrifugal separation at once, and without delay due to holdup time for reaching thermal equilibrium. By means of said centrifuging, the major part of the protein solids, e.g. between 70 and 95%, or higher, are separated and recovered, such thermal equilibrium, particularly at the low temperatures involved, being essential to the centrifugal separation of protein solids in improved high yield.

Establishing thermal equilibrium throughout the fat at a temperature sufficiently high to melt the higher melting fats present, which usually is at least about 115° F., and at the same time avoiding localized temperature conditions in excess of 120° F. to avoid coagulation of proteins present, requires close control within a narrow temperature range. A major problem in utilizing indirect heating of the fatty tissue stems from the difficulty of transferring heat through a dividing wall between a heating medium, e.g. steam or hot water, and the fatty tissue which is of viscous consistency. Extended heating areas are required with which the fatty tissue is brought into contact, and the necessary close control of temperature to avoid coagulation of proteins introduces delays in the heating process. Raising the temperature of the fatty tissue by the conversion of mechanical energy into heat in manipulation of the fat, on the other hand, provides an excellent means for the direct introduction of heat intimately and rapidly throughout the entire mass of fatty tissue under conditions readily affording close control of temperature conditions.

Any suitable device may be employed for the mechanical manipulation of the fatty tissue for purposes of dissipating mechanical energy therein. Examples are machines with high speed rotors capable of imparting energy to the mass through sheer (the mass itself being naturally in a form much like a semi-liquid paste), such as hammer mills, colloid mills, high sheer mixers, comminuting machines, high capacity pumps through which a part of the mass is recirculated, and the like. In the use of such devices, dissipation of mechanical energy is in large part through sheer of the relatively high viscosity fluidized mass of fatty tissue, temperature elevation being due to high friction. Rise in temperature is brought about not only quickly, but also uniformly throughout the mass of fatty tissue, thus establishing thermal equilibrium simultaneously with rise in temperature.

Very close control of temperature is afforded by virtue of the fact that the dissipation of mechanical energy, or in other words, its conversion into heat, is subject to close control through the operation of the device employed for the purpose.

The liquid effluent from the centrifugal separation contains fat, emulsion, water and the rest of the solids, the water being that, or in large part that, originally present in the fat. This liquid effluent may be processed in the same manner as in said patent or as in said co-pending application, e.g. by passing the same through a comminutor to insure reduction of the residual solids to a fine state of sub-division, e.g. to a point where the largest dimension of a particle does not exceed say 0.035", thereafter raising the mass in temperature, either directly, such as with live steam, or indirectly, such as in a heat exchanger, e.g. to between 180° and 210° F., and subsequently subjecting the same to centrifugal separation to recover the fat in purified state.

Additional features and advantages of the invention will become apparent to persons skilled in the art as the specification proceeds and upon reference to the drawings in which:

FIGURE 1 is a flow sheet diagrammatically illustrating the new process.

Referring now more particularly to the flow sheet, at 10 is shown a device for grinding or otherwise comminuting the fat at any desired temperature substantially below protein coagulating temperatures, that is, whether chilled, warm, or at room temperature. Preferably the grinding or other comminuting is such that the average particle size is below ¾", such as between 1/32" and ¾". The ground fat is delivered to tank 11 provided with an agitator indicated at 12. Tank 11 is also provided with means for temperature control of the fat. Any desired means may be employed for the purpose, and indirect temperature control of the fat in tank 11 is preferred, such as by the use of a heating coil or a jacket into which steam or hot water may be introduced to bring the fat to, or to hold the fat at, the desired temperature. The agitator 12 assists in obtaining and maintaining a degree of uniformity of temperature throughout the fat in the tank 11.

As indicated above the raw fat ground by grinder 10 flows to tank 11, with its protein in uncoagulated condition, and is brought therein to a temperature insufficiently high to melt the higher melting fats, such as those commonly referred to as stearine, in order to fluidize the mass for continuous flow purposes. This temperature rarely exceeds 110° F., 95° to 100° F. being an excellent range.

The fat under the temperature conditions indicated flows from tank 11 to device 13 for introducing mechanical energy into the fat, to quickly raise its temperature, with substantially complete thermal equilibrium throughout, sufficiently high to melt all of the fat, but not exceeding 120° F., and preferably not exceeding 117° F. Thereafter, the fat flows to centrifuge 14 under said thermal equilibrium conditions.

Pump 15 is illustrated for purposes of maintaining a substantially constant flow of fat to device 13 from tank 11, three-way valve 16 being illustrated for returning a part or all of the flow back to tank 11, as and if desired for any reason, e.g. for flow control and/or temperature control purposes. Also line 17 together with pump 18 are illustrated to show that the mass may be recirculated in part or in whole through device 13, as and if desired for any reason, e.g. in part to maintain a chosen temperature level, depending on the construction and operation of device 13.

As pointed out above, device 13 may be of any design and construction capable of converting mechanical input energy in very large part into heat output energy, and of delivering the latter intimately throughout a viscous mass passing therethrough. Many mills are available which calorific measurements show to be of very low efficiency in size reduction as compared to the heat generated during operation, e.g. efficiencies of less than 25% of total input energy.

Comminutors or other mills capable of sheering at a high rate are particularly suitable, such as disk mills generally, and particularly the type that is fed at the center with the space between the disks diminishing as the radial distance increases, the disks rotating relative to each other, and having rough or smooth surfaces.

Centrifuge 14 is of the continuous solids-discharge type wherein, in the practice of the invention, the major part of the solids, for example, between 75 and 95%, is removed in relatively dry condition from the rest of the mass and discharged as illustrated at 20. A typical centrifuge suited to the purpose is provided with a scroll for plowing the solids to a discharge point, an example of which is the centrifuge disclosed in U.S. Patents 2,679,974 and 2,703,676.

The liquid effluent separated in centrifuge 14, which contains the fat, emulsion, water and the rest of the solids is delivered therefrom at 21 and, as shown, flows to comminutor 22 wherein, if required for subsequent processing, the solids present are finely divided to such an extent that the largest dimension of a particle preferably does not exceed saiy 0.035". Comminutors suitable for the purpose are well known, and need not be further described.

The mass thereafter flows from comminutor 22 to tank 23 wherein its temperature is raised either by direct or indirect heating, such as by live steam, to at least 180° F. and preferably not higher than 210° F. Live steam may be introduced into the mass in tank 23 in any desired manner, steam distributor head 24, thermostat 25, valve 26, and steam source 27 being illustrated for the purpose.

The heated mass flows from tank 23 to centrifuge 28, pump 31 being illustrated for purposes of maintaining the flow substantially constant which is preferred. A three-way valve 32 is illustrated in line 33 leading from pump 31 to centrifuge 28, branch line 34 leading back to tank 23, whereby any desired amount of recirculation through tank 23 may be provided for at will.

High quality fat in high yield is delivered from the centrifuge 28 at 35 and is collected in tank 36 from which it may be delivered to any suitable point not shown. The emulsion, the water and the remainder of the solids are delivered from the centrifuge 28 as illustrated at 37.

A suitable centrifuge for preforming the operation of centrifuge 28 is illustrated in FIGURES 2 and 3 of the above-mentioned U.S. Patent 2,823,215, such centrifuge operating, for example, in substantially the same manner, for at this point the respective masses to be separated are similar.

This invention represents an improvement over the inventions described and claimed in the above-mentioned patent and in the above-mentioned co-pending application, in that a relatively low temperature is employed in an initial fat warming step, followed by a second step of melting of the fat by raising its temperature quickly through the introduction thereinto of mechanical energy under substantially complete thermal equilibrium conditions of a character to avoid any significant coagulation of the protein present in the fat, the final temperature being sufficiently high to melt the various fats present but not exceeding 120° F., and in that substantially complete thermal equilibrium is reached throughout the mass of fat simultaneously with the introduction of heat mechanically. The initial heating or warming provides fluidity of the fat at the relatively low temperature, and the subsequent heating under the conditions specified makes possible the immediate continuous centrifugal separation of the protein solids from the fluidized mass in high yield and in high quality, e.g. in uncoagulated condition and with substantially reduced fat content. Also, protein solids are thus produced in which the percentage of protein, fat and moisture are such as to ideally suit such protein solids for direct use in the production of sausage.

The following example is given by way of illustration and not of limitation.

Pass pork cutting fat without skins in a continuous stream through a grinder having a plate with say ⅜" diameter holes. Then pass the ground fat to a steam jacketed tank with an agitator and bring the ground fat up to a temperature of say 100° F. Then pass a stream of the fat to a comminutor in which through the application of mechanical energy to the fat the temperature of the fat is raised under thermal equilibrium conditions throughout to a temperature of approximately 117° F. Then pump a stream of the heated fat to a continuous solids discharge centrifuge of the type disclosed in U.S. Patents 2,679,964 and 2,703,676 and separate protein solids therein continuously from fat, emulsion and water. Protein solids having a moisture content of say 41% and a fat content of say 40% are thus obtained in excellent condition, and highly suitable for sale as such, or in other form, such as in sausage, the original feed being of edible pork fat.

Pass the liquid effluent from the centrifuge through a comminutor if necessary to insure that all solid particles present have as their largest dimension a size not exceeding approximately 0.035". Conduct the stream leaving the comminutor to a tank and therein treat the mass with live steam to raise its temperature to approximately 195° F. Pump a stream of the mass at the latter temperature to a centrifuge of the type described in connection with FIGURES 2 and 3 of Patent 2,823,215 to produce three streams, namely, clarified fat, valve sludge comprised of solids, water and emulsion, and valve operating fat, each stream being collected separately, the latter stream being returned to the last-mentioned tank. This is illustrated in the flow sheet by line 38. Clarified fat of high quality and in high yield is thus recovered, and valve sludge in excellent condition for batch dry rendering to recover values therefrom is thus obtained.

Any other animal fat may be substituted in the above example with comparable results. This includes beef fat, mutton fat, whale blubber, etc.

It will be understood, of course, that the proportion of protein in fatty tissue varies widely depending upon the animal and the part of the animal from which the fatty tissue is derived, and, such as in the case of cutting fats, the amount of meat that is cut away from the fatty tissue before it is fed to the process. In the practice of the process the available protein, in a form highly suitable for direct use in sausage, may be recovered in high yield, with both moisture and fat excellently proportioned to protein for the purpose.

Skins, particularly in the case of pork, are preferably rejected as raw material, not only in view of government regulations, but also to avoid the possible chance that bristles or hair will find their way into the product. Skins, however, may be processed if desired, or permitted by government regulations.

It is to be understood that the above particular description is by way of illustration, and that changes, omissions, additions, substitutions and/or other modifications may be made without departing from the spirit of the invention. Therefore, it is intended that the patent shall cover, by suitable expression in the claims, the various features of patentable novelty that reside in the invention.

I claim:
1. A process for separating protein solids and animal fat in animal fatty tissue while avoiding temperatures in excess of 120° F. comprising the steps of:
   (a) reducing said fatty tissue into a mass of particles of size from 1/32 to 3/4 inch,
   (b) initially warming the mass by application of heat to a first temperature not exceeding 110° F.,
   (c) then applying mechanical energy in the form of high friction to the warmed mass to the extent necessary to raise rapidly the mass to a second temperature above the first temperature by at least 5° F. and sufficiently high to melt higher melting fats present but not in excess of 120° F. to establish immediately substantially complete thermal equilibrium through the mass, the mass being fluidized at said second temperature, and
   (d) subjecting the mass at the second temperature to a zone of centrifugation to separate at least 70% of the protein solids from melted fats.

2. The process of claim 1 in which the second temperature is at least 115° F.

3. The process of claim 1 involving further subsequent steps in which the melted fats from which said at least 70% of the protein solids has been separated is subjected to comminution to reduce the size of the solids remaining therein, heated to raise its temperature to at least 180° F., and subjected to a second zone of centrifugation at a temperature of at least 180° F. to separate the remaining solids from the melted fats.

4. The process of claim 1 involving further subsequent steps in which the melted fats from which said at least 70% of the protein solids has been separated is heated to raise its temperature to at least 180° F., and subjected to a second zone of centrifugation at a temperature of at least 180° F. to separate the remaining solids from the protein fats.

References Cited in the file of this patent
UNITED STATES PATENTS

| | | |
|---|---|---|
| 1,930,091 | Halvorson et al. | Oct. 10, 1933 |
| 2,467,529 | Hormel | Apr. 19, 1949 |
| 2,697,112 | Kramer | Dec. 14, 1954 |
| 2,742,488 | Dufault | Apr. 17, 1956 |
| 2,745,856 | Dayen et al. | May 15, 1956 |
| 2,748,152 | Sifferd et al. | May 29, 1956 |
| 2,911,421 | Greenfield | Nov. 31, 1959 |

Dedication 3,078,287.—*Francis P. Downing*, Philadelphia, Pa. FAT RENDERING. Patent dated Feb. 19, 1963. Dedication filed July 3, 1963, by the assignee, *The Sharples Corporation*.

Hereby dedicates to the people of the United States the full term of said patent.

[*Official Gazette September 17, 1963.*]